US010070260B1

(12) United States Patent
Miyazawa et al.

(10) Patent No.: US 10,070,260 B1
(45) Date of Patent: Sep. 4, 2018

(54) POSITIONING INFORMATION APPLICATION SYSTEM, GATEWAY DEVICE, AND WEARABLE DEVICE

(71) Applicant: SEIKO EPSON CORPORATION, Tokyo (JP)

(72) Inventors: Shigeyoshi Miyazawa, Tokyo (JP); Seiichi Taniguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/751,039

(22) PCT Filed: Aug. 9, 2016

(86) PCT No.: PCT/JP2016/003670
§ 371 (c)(1),
(2) Date: Feb. 7, 2018

(87) PCT Pub. No.: WO2017/026120
PCT Pub. Date: Feb. 16, 2017

(30) Foreign Application Priority Data

Aug. 10, 2015  (JP) .................................. 2015-157975

(51) Int. Cl.
*H04M 11/04* (2006.01)
*H04W 4/02* (2018.01)
(Continued)

(52) U.S. Cl.
CPC ......... *H04W 4/023* (2013.01); *H04M 1/7253* (2013.01); *H04W 4/80* (2018.02)

(58) Field of Classification Search
CPC ....... H04W 4/023; H04W 4/02; H04W 4/027; H04W 4/80; H04W 64/00; H04W 4/025; H04W 4/029; H04W 4/90; H04W 4/021
See application file for complete search history.

(56) References Cited

U.S. PATENT DOCUMENTS 7,664,495 B1 *  2/2010  Bonner ................... H04W 4/16
                                                         370/338
2010/0315225 A1 * 12/2010  Teague ................. A61B 5/0024
                                                         340/539.12

(Continued)

FOREIGN PATENT DOCUMENTS

| JP | 2010-224723 A | 10/2010 |
| JP | 2010-244407 A | 10/2010 |
| WO | 2014/159646 A1 | 10/2014 |

*Primary Examiner* — Ronald Eisner

(57) ABSTRACT

Provided is a positioning information application system that is a configuration including a wearable device capable of acquiring the current position, and accurately determines and uses the position of the user; a gateway device; and a wearable device.

Comprising a wearable device 2 that is worn by a user and can acquire the current position, and a gateway device 3 that is a device capable of near-field communication with the wearable device 2 and can acquire or stores the current position. The wearable device 2 and gateway device 3 work together to determine whether first positioning information P1 indicating the current position of the wearable device 2, or second positioning information P2 indicating the current position of the gateway device 3, more accurately indicates the location of the user 7 wearing the wearable device 2 (step S5A, S6A), and uses the positioning information determined to be more accurate as the position of the user 7 (step S7A, S13A, S14A).

11 Claims, 6 Drawing Sheets

(51) Int. Cl.
*H04M 1/725* (2006.01)
*H04W 4/80* (2018.01)

(56) References Cited

U.S. PATENT DOCUMENTS

| | | | | |
|---|---|---|---|---|
| 2011/0279323 | A1* | 11/2011 | Hung | G01S 19/14 342/451 |
| 2012/0236820 | A1* | 9/2012 | Park | G08C 17/02 370/331 |
| 2013/0045759 | A1* | 2/2013 | Smith | H04W 4/029 455/456.6 |
| 2015/0123767 | A1* | 5/2015 | Tolle | G06K 19/07758 340/5.85 |

* cited by examiner

POSITIONING INFORMATION APPLICATION SYSTEM, GATEWAY DEVICE, AND WEARABLE DEVICE

CROSS-REFERENCE TO RELATED APPLICATIONS

This is a U.S. National Phase Application of International Patent Application No. PCT/JP2016/003670 filed on Aug. 9, 2016, which claims priority to Japanese Patent Application No. 2015-157975, filed on Aug. 10, 2015. The entire disclosure of Japanese Patent Application No. 2015-157975 is hereby incorporated herein by reference.

TECHNICAL FIELD

The present invention relates to a positioning information application system, a gateway device, and a wearable device.

BACKGROUND

Emergency evacuation guidance systems for quickly informing and guiding users to safe evacuation sites close to the location of the user when an earthquake occurs are known from the literature (see, for example, JP-A-2010-224723). This system uses a cell phone as a user terminal, and acquires earthquake reports from a public information broadcasting organization through a cell phone tower or other base station. Based on epicenter and magnitude information, the system also provides evacuation site guidance directing users to safe evacuation sites within the service area of the base station. PTL 1 describes the base station using the GPS system to acquire the absolute coordinates of the base station as latitude and longitude information.

SUMMARY

Wearable devices capable of communicatively connecting to the Internet through a smartphone or other gateway device have recently also become available. Because the wearable device usually displays the location of the user if the wearable device is able to acquire the current location using GPS satellites, the wearable device can provide information that is useful to the user, such as reporting the location of the user.

However, depending on the reception performance or current environment of the wearable device, the accuracy of the current location may drop, and precisely identifying the location of the user may not be possible.

An objective of the present invention is therefore to provide a wearable device, gateway device, and positioning information usage system capable of identifying with high precision the location of a user.

A positioning information application system including: a wearable device that is worn by a user and can acquire the current position, and a gateway device that is a device capable of near-field communication with the wearable device and can acquire or stores the current position; the wearable device and gateway device having a decision unit that determines whether first positioning information indicating the current position of the wearable device, or second positioning information indicating the current position of the gateway device, is more accurate as the location of the user.

Because this configuration determines whether the first positioning information indicating the current position of the wearable device, or the second positioning information indicating the current position of the gateway device, is more accurate as the location of the user, the positioning information determined to be more accurate can be used as the position of the user. As a result, the position of the user can be accurately determined and used.

The positioning information application system described above, further including a positioning information application unit that uses as the position of the user whichever of the first positioning information and second positioning information was determined to be more accurate; the positioning information application unit executing a process of reporting the positioning information to the user. This configuration can accurately inform the user of the user's location, and the user can more easily accurately communicate the user's location to another person.

The positioning information application system described above, wherein the positioning information application unit converts the positioning information to a grid coordinate system of a map used by organizations that may be candidates to be informed of the positioning information, and reports to the user. This configuration can accurately communicate the user's location to the user in a format useful for communication to a candidate contact organization, and can easily and accurately communicate the location to that organization.

The positioning information application system described above, wherein the positioning information application unit, when the decision unit determines the accuracy of the first positioning information and second positioning information is the same, uses the first positioning information for the position of the user. Because the gateway device is more likely than the wearable device to be at a position removed from the user, this configuration can more easily acquire the location of the user.

The positioning information application system described above, wherein the positioning information application unit acquires based on the positioning information, and reports to the user, a route to be traveled by the user. This configuration can inform the user of the route to travel.

The positioning information application system described above, wherein the positioning information application unit queries, through the gateway device, a service-providing server, which provides a route to be traveled based on positioning information, for a route based on the positioning information, and acquires the route. This configuration can more easily acquire an appropriate route using information known on the service-providing server side. The service-providing server side can also determine the location of the user for use in subsequent rescue operations when a disaster occurs, for example.

The positioning information application system described above, wherein at least one of the wearable device and gateway device is able to receive emergency reports; and when a report is received, the decision unit starts the decision process, and the positioning information application unit executes the application process. This configuration enables quickly and accurately identifying the location of the user when triggered by a disaster report, and quickly taking appropriate action based on the positioning information.

The positioning information application system described above, wherein the decision unit, based on at least information related to the GPS positioning accuracy, determines whether the first positioning information or the second positioning information is more accurate. This configuration enables accurately determining the more accurate positioning information.

Another aspect of the invention is a gateway device that can acquire or store the current position, is a device capable of near-field communication with a wearable device that is worn by a user and can acquire the current position, and includes: a decision unit that, in cooperation with the wearable device, determines whether first positioning information indicating the current position of the wearable device, or second positioning information indicating the current position of the gateway device, is more accurate as the location of the user; and a positioning information application unit that uses, as the position of the user, whichever of the first positioning information and second positioning information was determined to be more accurate.

This configuration determines whether the first positioning information indicating the current position of the wearable device, or the second positioning information indicating the current position of the gateway device, is more accurate as the location of the user, and uses the positioning information determined to be more accurate as the position of the user. As a result, the position of the user can be accurately determined and used.

Another aspect of the invention is a wearable device that is worn by a user and can acquire the current position, and has a decision unit that, in cooperation with a gateway device that can acquire or store the current position, and is capable of near-field communication with the wearable device that is worn by a user and can acquire the current position, determines whether first positioning information indicating the current position of the wearable device, or second positioning information indicating the current position of the gateway device, is more accurate as the location of the user; and a positioning information application unit that uses, as the position of the user, whichever of the first positioning information and second positioning information was determined to be more accurate.

This configuration determines whether the first positioning information indicating the current position of the wearable device, or the second positioning information indicating the current position of the gateway device, is more accurate as the location of the user, and uses the positioning information determined to be more accurate as the position of the user. As a result, the position of the user can be accurately determined and used.

DESCRIPTION OF EMBODIMENTS

Embodiments of the invention are described below with reference to the figures.

Figure 1:
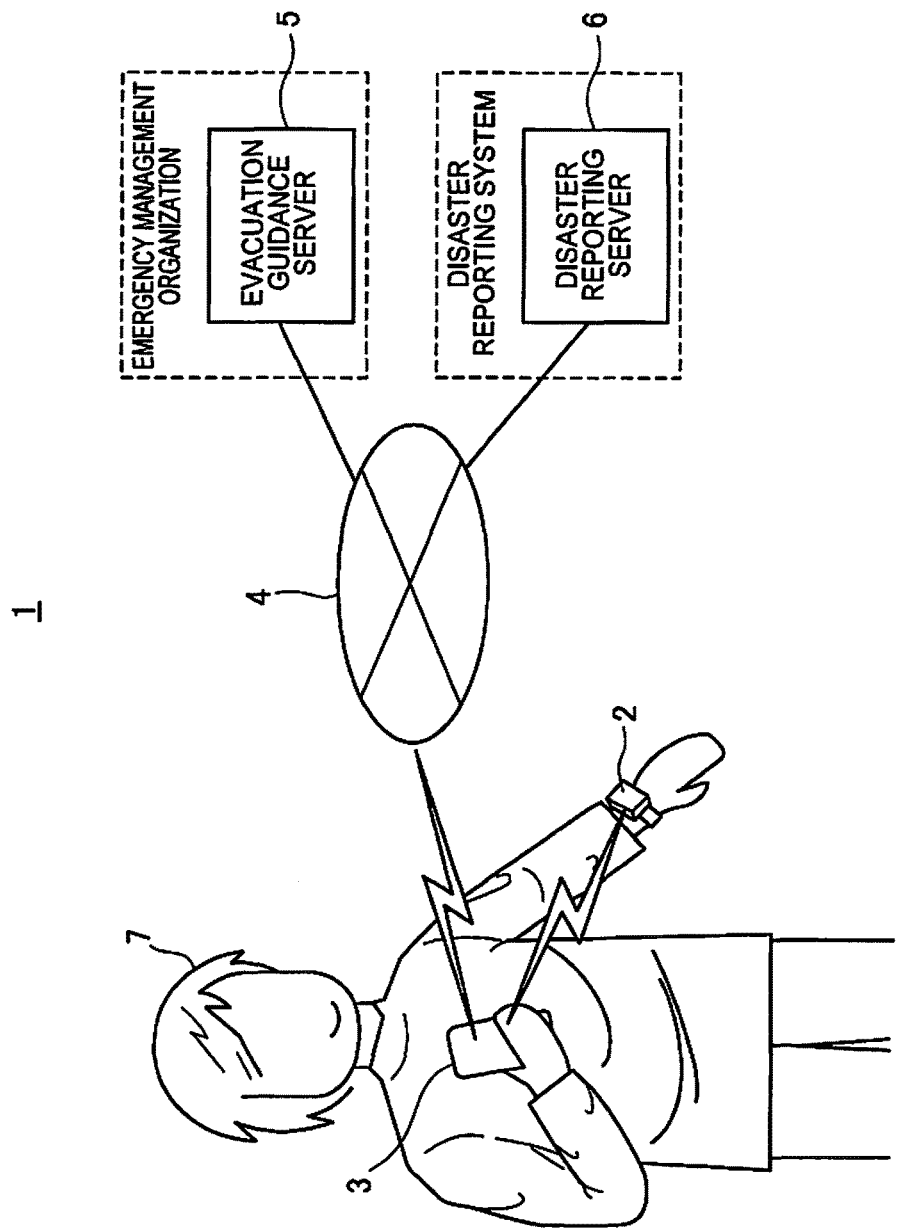
FIG. 1 illustrates a guidance system related to an embodiment of a positioning information application system according to the invention.

FIG. 1 illustrates a guidance system related to an embodiment of a positioning information application system according to the invention.

The guidance system 1 is a system that provides users with information useful for evacuation guidance to numerous users. The guidance system 1 includes a wearable device 2 worn by a user, a gateway device 3 capable of near-field communication with the wearable device 2, an evacuation guidance server 5 that communicatively connects to a communication network (the Internet in this embodiment) 4, and a disaster reporting server 6 that issues reports when a disaster occurs. This embodiment is describes an example using a single user 7.

Note that near-field communication is a method of communicating over short distances of several centimeters to several ten centimeters using less transmission power than normal communication. One example is the international wireless communication standard known as Near Field communication (NFC).

The evacuation guidance server 5 is a server managed by an emergency management organization that develops and implements emergency response plans when a disaster occurs, and is a server of a service provider that provides information useful for evacuation guidance to multiple users, including user 7, through the communication network 4.

Disasters to which the guidance system 1 is directed are emergencies creating a need to take refuge, and are not limited to natural disasters such as earthquakes, wind and water damage, and volcanic eruptions, and include disasters from war and terrorism, fire, and accidents. The guidance system is also not limited to addressing all said disasters, and may be directed to one or more particular types of emergencies.

The disaster reporting server 6 is an announcement server in a disaster reporting system that reports disasters, and reports a disaster through the communication network 4 to multiple users including user 7. More specifically, the disaster reporting server 6 may broadcast earthquake reports and tsunami warnings broadcast by a national meteorological agency, and emergency and evacuation information broadcast by national and regional government authorities, to terminal devices (such as the gateway device 3 of the invention).

The wearable device 2 is a relatively small device worn or carried by the user 7. The wearable device 2 is a mobile information processing device having at least a positioning function for acquiring the current location, and a communication function enabling near-field communication with a gateway device 3. In this embodiment, the wearable device 2 is a wristwatch-type device that can be worn on the wrist by the user 7, and is an example of currently popular IoT (Internet of Things) devices.

The wearable device 2 has a power generator 19, and stores power generated by the power generator 19 in the power supply 20. The power generator 19 may use a wide range of known generating devices, including solar power generation, thermoelectric generation, and devices that use the kinetic energy of a rotary pendulum that turns with movement of the user's 7 wrist. The power supply 20 supplies operating power to other parts of the wearable device 2. By having a power generator 19, the wearable device 2 can continue operating without losing power in times of emergency.

The gateway device 3 is a device that relays communication between the wearable device 2 and devices connected to the communication network 4 (including an evacuation guidance server 5 and a disaster reporting server 6), and has at least communication functions for communicating by near-field communication with the wearable device 2 and communicating with devices connected to the wireless network 4, and a positioning function enabling acquiring its current location.

FIG. 1 illustrates an example in which a smartphone (mobile communication terminal) carried by the user 7 and able to access the communication network 4 through a mobile communication network is used as the gateway device 3.

Some possible configurations of the gateway device 3 are described below. The gateway device 3 may be a mobile communication device other than a smartphone, such as a simple cell phone or wireless router. The gateway device 3 may also be configured as a moving communication terminal (such as an airship, drone, or other aircraft, or a vehicle that travels on roads), or a stationary communication terminal affixed to the ground or a building. The moving or stationary communication terminal may be a base station forming part of a wireless communication network. For example, a moving base station may be configured as an airship or drone that is used during a disaster to restore a mobile communication network and is capable of deploying a wireless LAN or other near-field communication zone as needed. A stationary base station may be installed on each floor of a building, for example, and capable of creating a wireless LAN or other near-field communication area as needed.

Figure 2:
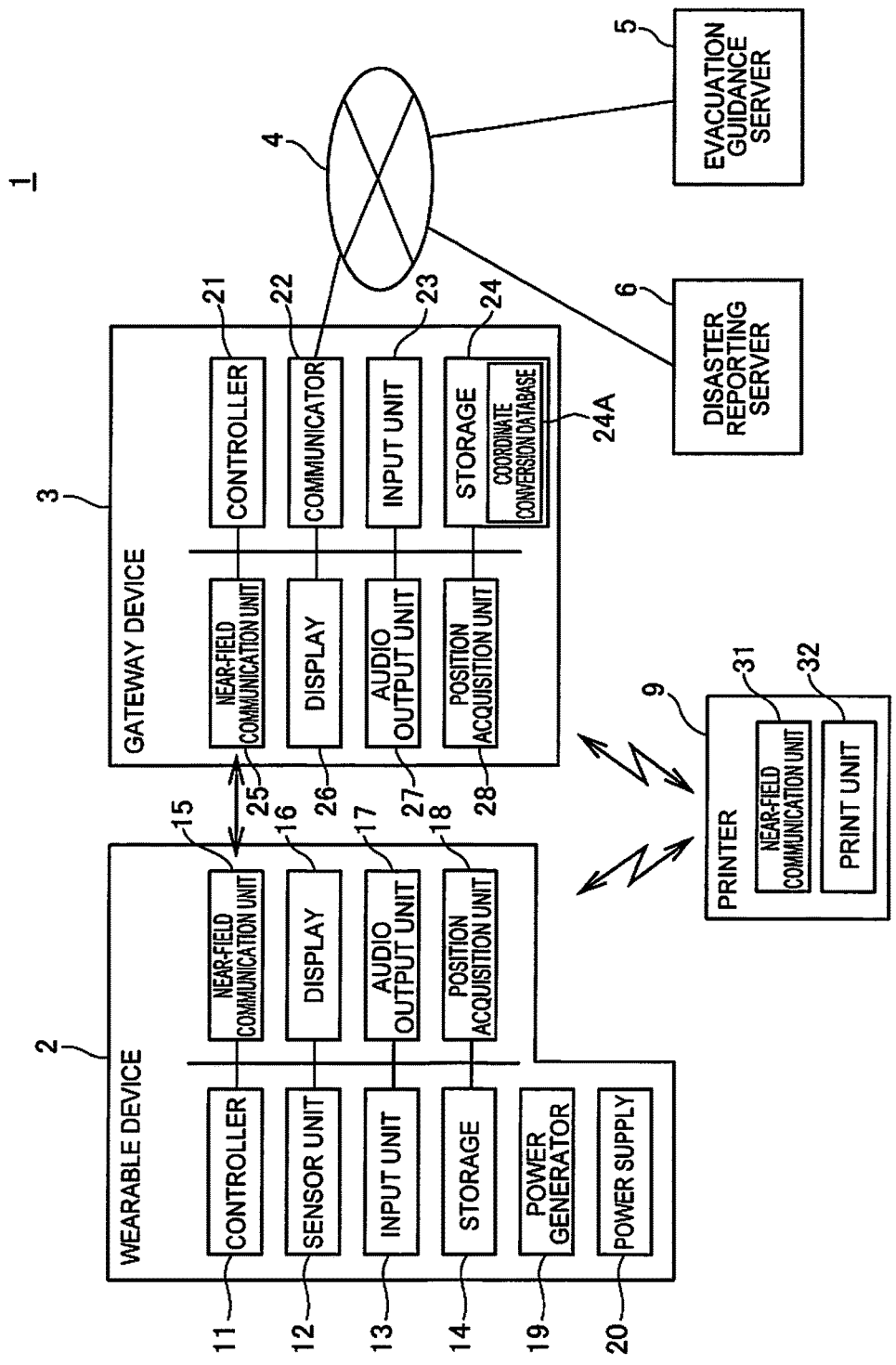
FIG. 2 illustrates the functional configuration of parts of a guidance system.

FIG. 2 illustrates the functional configuration of parts of the guidance system 1.

The wearable device 2 has a controller 11, sensor unit 12, input unit 13, storage 14, near-field communication unit 15, display 16, audio output unit 17, and position acquisition unit 18.

The controller 11 has the configuration of a computer including a CPU, ROM, and RAM, and functions as an information processor that centrally controls other parts and operating processes. The sensor unit 12 includes a sensor for acquiring vital information for the user 7, the wearer. One or more of the following sensors may be used as the sensor: an acceleration sensor (including a gravity sensor) that detects acceleration; an angular velocity sensor that detects angular velocity; a pulse rate sensor that detects the pulse rate of the user 7; a blood pressure sensor that detects the blood pressure of the user 7; a brain wave sensor that detects brain waves of the user 7; temperature sensor that detects the temperature; a geomagnetic field sensor that detects geomagnetism (also called an orientation sensor); or a barometric pressure sensor (also called an altitude sensor). Note that the vital information acquired by the sensor unit 12 may be narrowly defined vital signs (pulse rate, blood pressure, blood oxygen saturation, and body temperature), or more broadly defined vital signs including brain waves, body fat percentage, and blood type.

The controller 11 detects the physical activity and physical abnormalities of the user 7 by detecting, by the sensor unit 12, the movement (acceleration, angular velocity, direction of travel (orientation)), change in altitude (barometric pressure change) and other vital information (pulse rate, blood pressure, blood oxygen saturation, brain waves) of the user 7. A physical abnormality is determined if, for example, the pulse rate, blood pressure, or brain wave information, for example, meets a specific predetermined condition. The temperature sensor may be used to detect the temperature of the user 7, or to detect the ambient temperature. Methods known from the literature may be used to detect physical activity and physical abnormalities.

Note that the sensor unit 12 is not limited to detecting vital information of the user 7, and may be used to detect movement of the wearable device 2, for example. For example, if the wearable device 2 has an imaging unit (camera), image stabilization based on the detection results from an angular velocity sensor may be applied.

The input unit 13 is a device for inputting user 7 instructions, and may input user 7 instructions through operating switches not shown or a touch panel disposed to the display 16, for example.

The storage 14 is a device for storing control programs and data required for the wearable device 2 to execute processes.

The near-field communication unit 15 is a device that communicates by near-field communication with the gateway device 3, for example, as controlled by the controller 11, and in this embodiment communicates by Bluetooth®, wireless LAN, or ZigBee®. In this embodiment, as shown in FIG. 2, the wearable device 2 and gateway device 3 can communicate with a printer 9 having a near-field communication unit 31 conforming to the same standard. As a result, by wirelessly sending print data from the wearable device 2 or gateway device 3 to the printer 9, the print unit 32 (media output unit) of the printer 9 can output print media recording an image corresponding to the print data.

The display 16 has an LCD panel, OLED panel, e-paper, or other type of display device, and displays information for the user 7 as controlled by the controller 11. The audio output unit 17 includes an amplifier and speaker, and outputs audio to the user 7, as controlled by the controller 11.

The position acquisition unit 18 is a device that acquires the current location using GPS (Global Positioning System), receives radio signals from GPS satellites through a GPS antenna not shown, and calculates the current position expressed by latitude and longitude. Note that this embodiment uses the GPS system as an example, but positioning detection methods using other than the GPS system may be used.

The gateway device 3 includes a controller 21, communicator 22, input unit 23, storage 24, near-field communication unit 25, display 26, audio output unit 27, and position acquisition unit 28.

The controller 21 is configured like a computer with a CPU, ROM, and RAM, and functions as an information processor that centrally controls other parts and operating processes. The communicator 22 communicates as controlled by the controller 21 according to a specific wireless communication network standard, for example. As a result, the gateway device 3 can use services (such as disaster reports from a telephone or cell phone company) that use a wireless communication network, and can use services from the communication network 4 through the wireless communication network.

The communicator 22, as controlled by the controller 21, relays communication between the wearable device 2 and communication network 4. As a result, the wearable device 2 can access the communication network 4, and receive data from servers connected to the communication network 4.

The input unit 23 is a device for inputting user 7 instructions, and inputs user 7 instructions through operating switches not shown and a touch panel disposed to the display 16, for example.

The storage 24 is a device that stores control programs and data required by the gateway device 3 to execute processes. A coordinate conversion database (coordinate conversion DB) 24A storing information for converting latitude and longitude positioning information to UTM grid coordinates as described below.

The near-field communication unit 25 is a device that communicates wirelessly by near-field communication with the wearable device 2 and printer 9, for example, as controlled by the controller 21, and in this embodiment communicates by Bluetooth®, wireless LAN, or ZigBee®.

The display 26 has an LCD panel, OLED panel, or other type of display device, and displays information for the user 7 as controlled by the controller 21. The audio output unit 27 includes an amplifier and speaker, and outputs audio to the user 7 as controlled by the controller 21.

The position acquisition unit 28 is a device that acquires the current location using GPS, receives radio signals from GPS satellites through a GPS antenna not shown, and calculates the current position from latitude and longitude information. Note that this embodiment uses the GPS system as an example, but positioning detection methods using other than the GPS system may be used.

Because the guidance system 1 is a system that, when a disaster occurs, accurately reports the location of the user 7, and provides an evacuation route based on the accurate location, accurately determining the location of the user 7 is essential.

The location of the wearable device 2 worn by the user 7 can normally be considered the location of the user 7. However, the location of the user 7 cannot be determined if the current location of the wearable device 2 cannot be accurately detected due to the ambient environment, for example. Because the gateway device 3 in this embodiment of the invention is a device that communicates by near-field communication with the wearable device 2, and more particularly is a smartphone carried by the user 7, the location of the gateway device 3 may also be considered the location of the user 7.

To accurately determine the location of the user 7, this embodiment of the invention executes a process of determining which is more accurate, first positioning information P1 identifying the current location detected by the wearable device 2, or second positioning information P2 indicating the current location detected by the gateway device 3. The operation of the guidance system 1, including this decision process, is described below.

Figure 3:
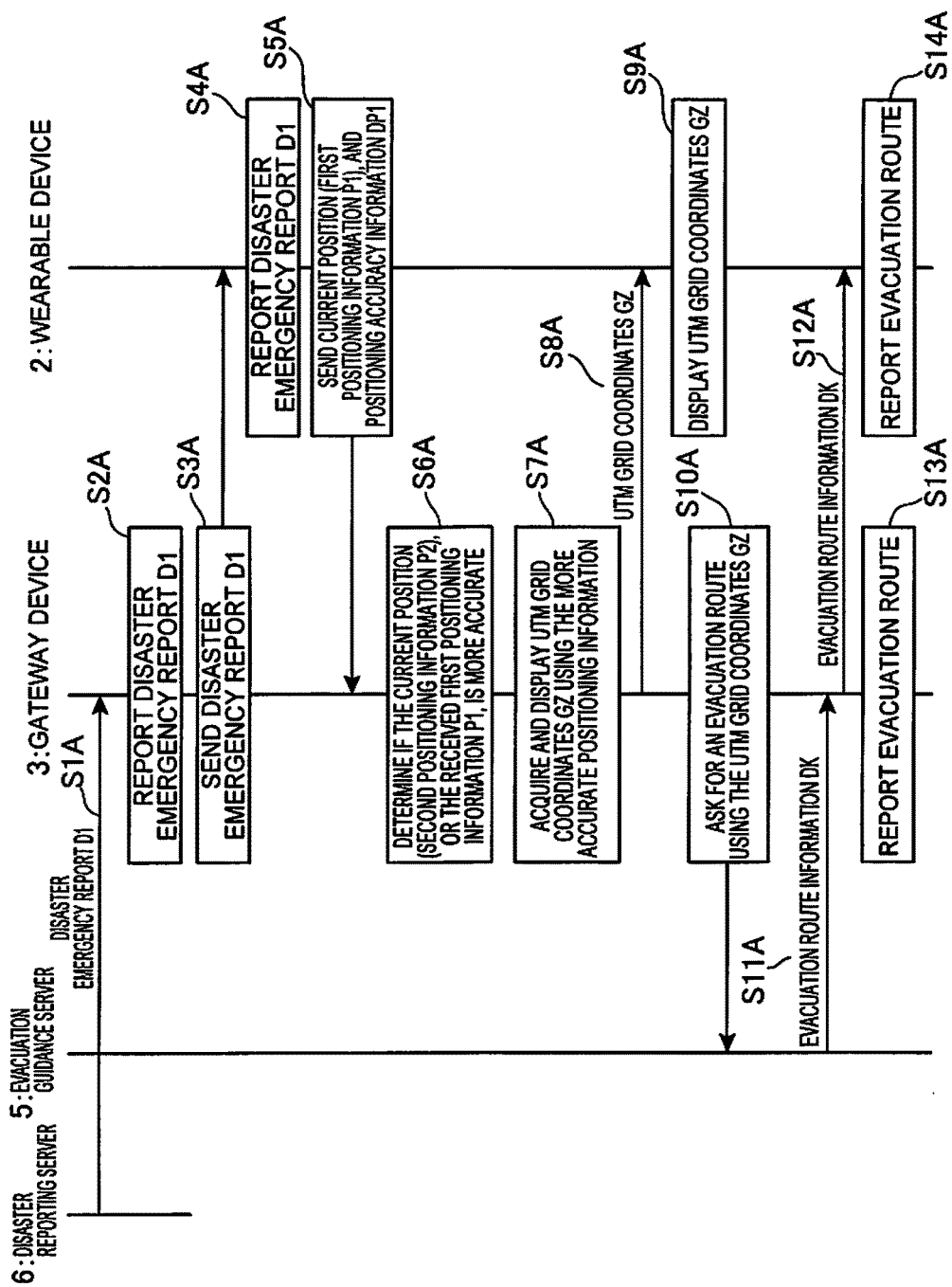
FIG. 3 illustrates the operation of the guidance system.

FIG. 3 illustrates the operation of the guidance system 1. This guidance system 1 starts operating when triggered by a disaster report (referred to below as disaster emergency report D1) from the disaster reporting server 6. This operation supposes that the wearable device 2 and gateway device 3 are executing a process of periodically acquiring the current location by means of their respective position acquisition units 18, 28.

As shown in FIG. 3, the disaster reporting server 6 quickly sends a disaster emergency report D1 to the gateway device 3 when an emergency occurs (step S1A). The gateway device 3, as controlled by the controller 21, processes reporting the disaster emergency report D1 to the user 7 through the display 26 and audio output unit 27 (step S2A). As controlled by the controller 21, the gateway device 3 also sends the disaster emergency report D1 by the near-field communication unit 25 to the wearable device 2 (step S3A).

When a disaster emergency report D1 is received, the wearable device 2, as controlled by the controller 11, processes reporting the disaster emergency report D1 to the user 7 by means of the display 16 and audio output unit 17 (step S4A). Also as controlled by the controller 11, the wearable device 2 sends first positioning information P1 acquired by the position acquisition unit 18 with positioning accuracy information DP1 to the gateway device 3 (step S5A).

The positioning accuracy information DP1 is information related to the positioning accuracy of the first positioning information P1, and in this embodiment of the invention is information indicating the GPS signal reception condition and time-of-acquisition information. The information indicating the GPS signal reception condition includes a DOP (Dilution Of Precision) value and signal reception strength. The DOP value is determined by the locations of the GPS satellites overhead, and GPS positioning accuracy increases as the DOP value decreases. A particularly low signal reception strength value indicates positioning accuracy may be low. The time-of-acquisition is the time the current location was most recently acquired, and the older the time-of-acquisition, the greater the likelihood that the positioning information differs from the actual current location. Note that the positioning accuracy information DP1 includes at least one of the DOP value and time-of-acquisition.

When the first positioning information P1 and positioning accuracy information DP1 are received, the gateway device 3 executes a process of determining which of the most recent second positioning information P2 and first positioning information P1 acquired by the position acquisition unit 28 more accurately indicates the position of the user 7 (step S6A). This decision process may be executed together by the gateway device 3 and wearable device 2, and in this example is executed by the controller 21 of the gateway device 3.

In this event, the controller 21 first acquires information equivalent to positioning accuracy information DP1 for the wearable device 2, and positioning accuracy information DP2 for the gateway device 3. This positioning accuracy information DP2 is information related to the positioning accuracy of the second positioning information P2, and in this embodiment is information indicating the GPS signal reception condition (DOP value and time-of-acquisition), and information indicating the time of acquisition.

Next, the controller 21 compares the positioning accuracy information DP1 and positioning accuracy information DP2, and based on the result determines whether the first positioning information P1 or second positioning information P2 is more accurate. For example, if both DOP values are within a predetermined normal range, the positioning information with the newest time-of-acquisition is determined to be more accurate, and if either DOP value is outside the normal range, the positioning information corresponding to the other DOP value is determined to be more accurate.

If the first positioning information P1 and second positioning information P2 are determined to be equally accurate based only on the positioning accuracy information DP1 and positioning accuracy information DP2, the controller 21 may use the second positioning information P2 as the location of the user 7.

Because the gateway device 3 is generally less limited in terms of size, for example, than the wearable device 2, the gateway device 3 may be configured with a relatively large GPS antenna enabling relatively greater positioning performance. If the accuracy of the positioning information of the gateway device 3 and wearable device 2 cannot be differentiated, acquiring the most recent location is easier by prioritizing use of positioning information from the gateway device 3.

Note that if the gateway device 3 is a mobile or stationary base station configuring part of a wireless communication network, highly precise positioning information (second positioning information P2) may be stored or measured by the base station. If a base station disposed in a building, even more precise, detailed positioning information including the floor on which the base station is deployed may also be stored.

In this case, the gateway device 3 within near-field communication range may be considered the location of the user 7, and the positioning information (second positioning information P2) of the gateway device 3 may be determined to be the highly accurate location of the user 7.

Furthermore, if the first positioning information P1 and second positioning information P2 are determined to be equally accurate based only on comparing the positioning accuracy information DP1 and positioning accuracy information DP2, the second positioning information P2 may be used as the accurate location of the user 7. Because the possibility of the gateway device 3 being at a position farther from the user 7 than the wearable device 2 is also high, using the second positioning information P2 measured by the wearable device 2 as the location of the user 7 enables more easily determining the position of the user 7.

Once the controller 21 determines which of the first positioning information P1 and second positioning information P2 is more accurate, the gateway device 3, using the latitude and longitude positioning information determined to be more accurate, acquires and displays on the display 26 the UTM grid coordinates GZ (step S7A). The controller 21 also runs the process of converting the positioning information to UTM grid coordinates GZ and displaying the location. Note that the controller 21 uses the coordinate conversion database 24A (see FIG. 2) to UTM grid coordinates GZ.

More specifically, the controller 21 functions as a decision unit that performs the foregoing decision process, and a positioning information application unit for informing the user 7.

UTM grid coordinates are described next.

The UTM grid is a grid map coordinate system defined by an international standard, is known internationally as the MGRS (Military Grid Reference System), and is a method of determining a position on Earth, and the format of positioning information expressed by this method. As described below, an advantage of using the UTM grid system is that a position can be expressed more easily than with latitude and longitude coordinates.

Figure 4:
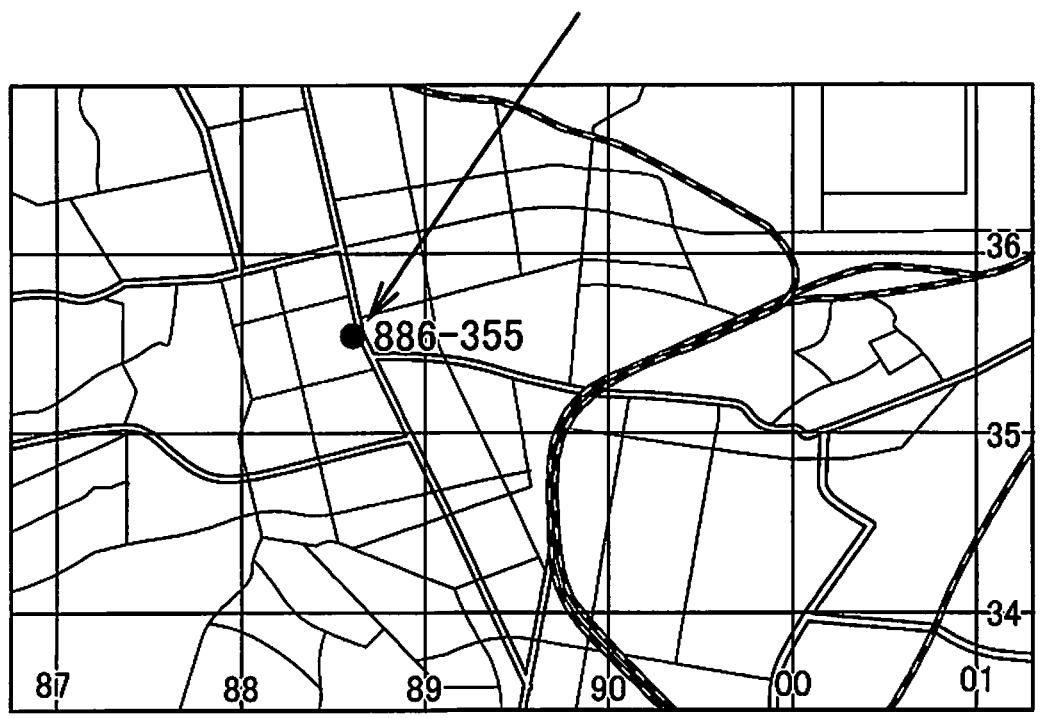
FIG. 4 shows an example of a UTM grid map.
Figure 5A:
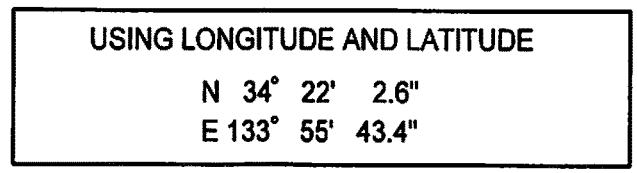
FIG. 5A illustrates the relationship between UTN grid coordinates and latitude and longitude.
Figure 5A:
Figure 5A:

FIG. 4 shows an example of a UTM grid map applying the UTM grid to a map. FIG. 5A illustrates the relationship between UTN grid coordinates and latitude and longitude, and FIG. 5B illustrates the format of the UTN grid coordinates.

A UTM Grid map is a map that divides a map created as a Universal Transverse Mercator (UTM) conformal projection into units of a specific length on the north-south axis and east-west axis. A UTM Grid map has a grid (standard lines) extending north-south and east-west at specific intervals, and uses coordinates to identify specific areas (grid zones) in the grid. These coordinates are called UTM Grid coordinates.

In a typical UTM Grid, a target area (which may be the entire Earth) is divided into grid squares a maximum 100 km per side, and the 100 km grid squares are further divided into a grid of smaller areas at a 100 m, 10 m, or 1 m precision. UTM grid coordinates have a hierarchical structure combining a 5-digit area code identifying the largest grid square, and a code of a specific number of digits identifying a position within the grid square.

Figure 5B:
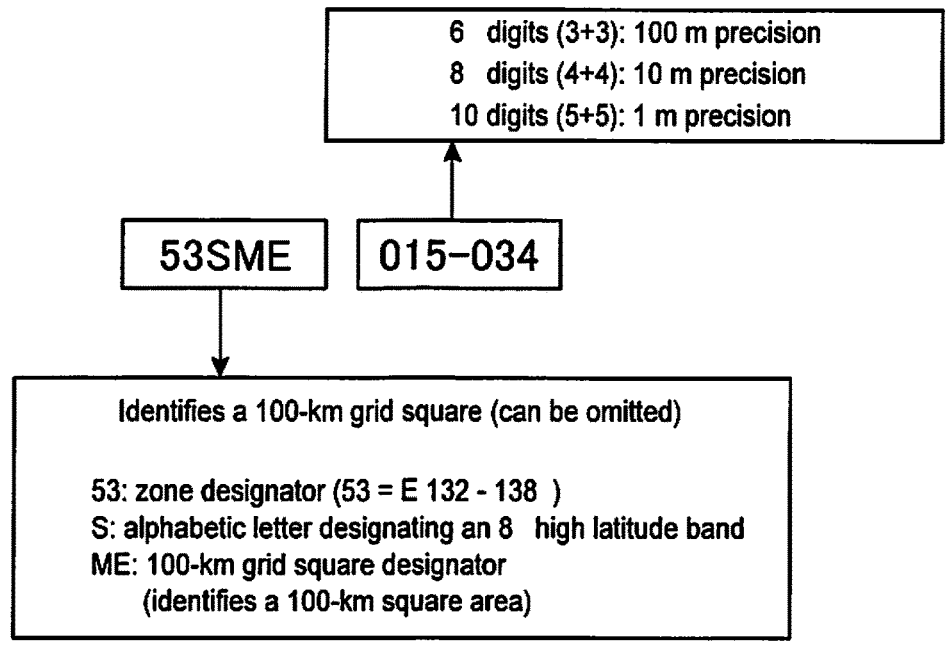
FIG. 5B illustrates the format of UTN grid coordinates.

FIG. 5B shows 53SME as an example of a 5-digit area code identifying a 100 km grid square. In this area code, 53 is the zone number indicating the east-west position. The latitude (north-south direction) is divided into bands 8° high, an alphabetic letter is assigned to each band, and in this example the S in the area code identifies the latitude band. The ME in the area code is a 100-km UTM grid square code identifying a specific 100-km square area. The east-west zone number identifies a longitudinal zone (in the example in the figure, 132-138° east longitude), and the code indicating the north-south position corresponds to a latitude band of a specific height (8° latitude in the example in the figure). The area code can be omitted. For example, to express a position anywhere in Japan using UTM grid coordinates, the area code is required because the target area is significantly larger than the 100 km square size of the maximum grid square. However, to identify a location in an area contained within a 100 km square, every position will have the same 5-digit area code, and the area code can be omitted.

The square areas into which grid squares are divided at 100 m, 10 m, or 1 m precision are identified by an n-digit number (where n is an integer) identifying the north-south position, and an n-digit number identifying the east-west position. This number of two n-digit values may also be referred to as MGRS coordinates. For example, the UTM grid coordinates of the area including the position indicated by the arrow in FIG. 4 are 886-355. In the example in FIG. 5A, the position identified by the longitude and latitude coordinates 34°22'2.6"N and 133°55'43.4"E is identified by the UTM grid coordinates 53SME 015-034.

If the grid interval is 100 m, the UTM grid coordinates are a 6-digit value where n=3. If the grid interval is 10 m, the UTM grid coordinates are an 8-digit value where n=4. If the grid interval is 1 m, the UTM grid coordinates are a 10-digit value where n=5.

The UTM grid coordinates thus define an area including a specific position (location), and the positioning precision is determined by the size of the grid (100 m, 10 m, or 1 m). If the UTM grid coordinates are a 6-digit value, such as 015-034, an area 100 m square can be identified, or in other words, the precision is 100 m. The precision is 10 m if the coordinates are 8 digits long (4+4 digits), and the precision is 1 m if the coordinates are 10 digits long (5+5 digits). Increasing the number of digits in the coordinates enables identifying a location with high precision, and if high precision is not required, the number of digits in the coordinates can be reduced To express the current location in latitude and longitude using a 5 digit value for example, three digits are required in the integer portion, and the decimal portion is two digits. Because 1° of latitude and longitude is approximately equal to 111 km (40000 km/360°), a 2-digit decimal portion means a precision of approximately 1.11 km. More digits are required to express a location with greater precision, and if the decimal portion is 4 digits (the total length is 7 digits), the positioning precision is approximately 11 m.

In other words, if a method of identifying a location by latitude and longitude is used, and a certain degree of precision is required, a long string of many digits including seven or more digits expressing the latitude and seven or more digits expressing the longitude is required. Communicating such a long string of numbers verbally invites communication errors.

For the foregoing reason, using grid coordinates is extremely effective. More specifically, a UTM coordinate value using a combination of 4+4 digits can express a position with the same precision as latitude and longitude coordinates of 7+7 digits.

An advantage of using UTM grid coordinates is that less information is required to express the same position than with latitude and longitude coordinates, and the expression is simpler. In the examples shown in FIG. 5A and FIG. 5B, the area code 53SME can be omitted, the coordinates expressed as only 015-034, and the position identified by this 6-digit value can be identified with 100 m precision. Because the coordinate structure is simple, the coordinates can be easily and accurately communicated from person to person, which is particularly useful when communicating a location by telephone or radio. If a UTM grid map and UTM grid coordinates are used, even someone that is unfamiliar with local place names or addressing methods can easily identify and know a position. In places with place names that are difficult to read or have complicated administrative divisions, place names and addresses can be difficult for someone from a different place to understand. When a disaster occurs, it is therefore desirable for people involved in rescue operations in the disaster zone to be able to use a method that does not depend on place names and addresses to identify a specific location in the disaster zone. A method that does not use place names and addresses is particularly desirable in the case of a wide area disaster or search and rescue operation requiring rescue workers from outside the local area. UTM grid coordinates are therefore an extremely effective tool for communicating positioning information because locations can be identified more reliably using few digits.

As shown in FIG. 3, when the UTM grid coordinates GZ are acquired by the gateway device 3 in this guidance system 1, the UTM grid coordinates GZ are sent from the gateway device 3 to the wearable device 2 as controlled by the controller 21 (step S8A). The wearable device 2 then displays the UTM grid coordinates GZ on the display 16 as controlled by the controller 11 (step S9A). In other words, similarly to the controller 21 of the gateway device 3, the controller 11 of the wearable device 2 functions as a positioning information application unit that acquires and reports the UTM grid coordinates GZ to the user 7.

This enables the user 7 to know the user's location in UTM grid coordinates GZ by both the gateway device 3 and wearable device 2. The user 7 can therefore more easily communicate the user's location to another person (such as an emergency response organization) by telephone. Furthermore, even if the gateway device 3 is in the backpack or purse of the user 7, the user 7 can easily know the UTM grid coordinates GZ through the wearable device 2.

This guidance system 1 also enables querying a evacuation guidance server 5 for an evacuation route using the UTM grid coordinates GZ. As shown in FIG. 3, this query is handled by the controller 21 of the gateway device 3 that also executes the process of converting to UTM grid coordinates GZ (step S10A). In this case, the controller 21 sends the UTM grid coordinates GZ and an evacuation route query to the evacuation guidance server 5 through the communicator 22.

Upon receiving the query, the evacuation guidance server 5 determines the location of the evacuee (user 7) from the UTM grid coordinates GZ, acquires an evacuation route from that location to the best evacuation site, and sends evacuation route information DK to the gateway device 3 (step S11A).

The evacuation route information DK is data for displaying an evacuation route, and in this embodiment of the invention is image data indicating the evacuation route. The information is not limited to image data, and may be data enabling the gateway device 3 to display the evacuation route by using a route searching function (such as position-ing information indicating the destination (the most suitable evacuation site) and route information).

Note that because the communication network 4 may be congested in a disaster, the gateway device 3, or both the gateway device 3 and wearable device 2, preferably display a message such as "search in progress" until the evacuation route information DK is received.

When the evacuation route information DK is received, the gateway device 3, as controlled by the controller 21, sends the evacuation route information DK to the wearable device 2 by the near-field communication unit 25 (step S12A), and executes an evacuation route reporting process (step S13A). In addition, when the wearable device 2 receives the evacuation route information DK, the wearable device 2 executes an evacuation route reporting process as controlled by the controller 11 (step S14A). This reporting process displays the evacuation route and thereby communicates the evacuation route to the user 7.

More specifically, the controller 21 of the gateway device 3, and the controller 21 of the wearable device 2, function as positioning information application units that acquire and report an evacuation route to the user 7 using positioning information. Furthermore, because the evacuation route is communicated by both the gateway device 3 and wearable device 2, the user 7 can easily learn the evacuation route even if the gateway device 3 is in the backpack or bag of the user 7.

Figure 6:
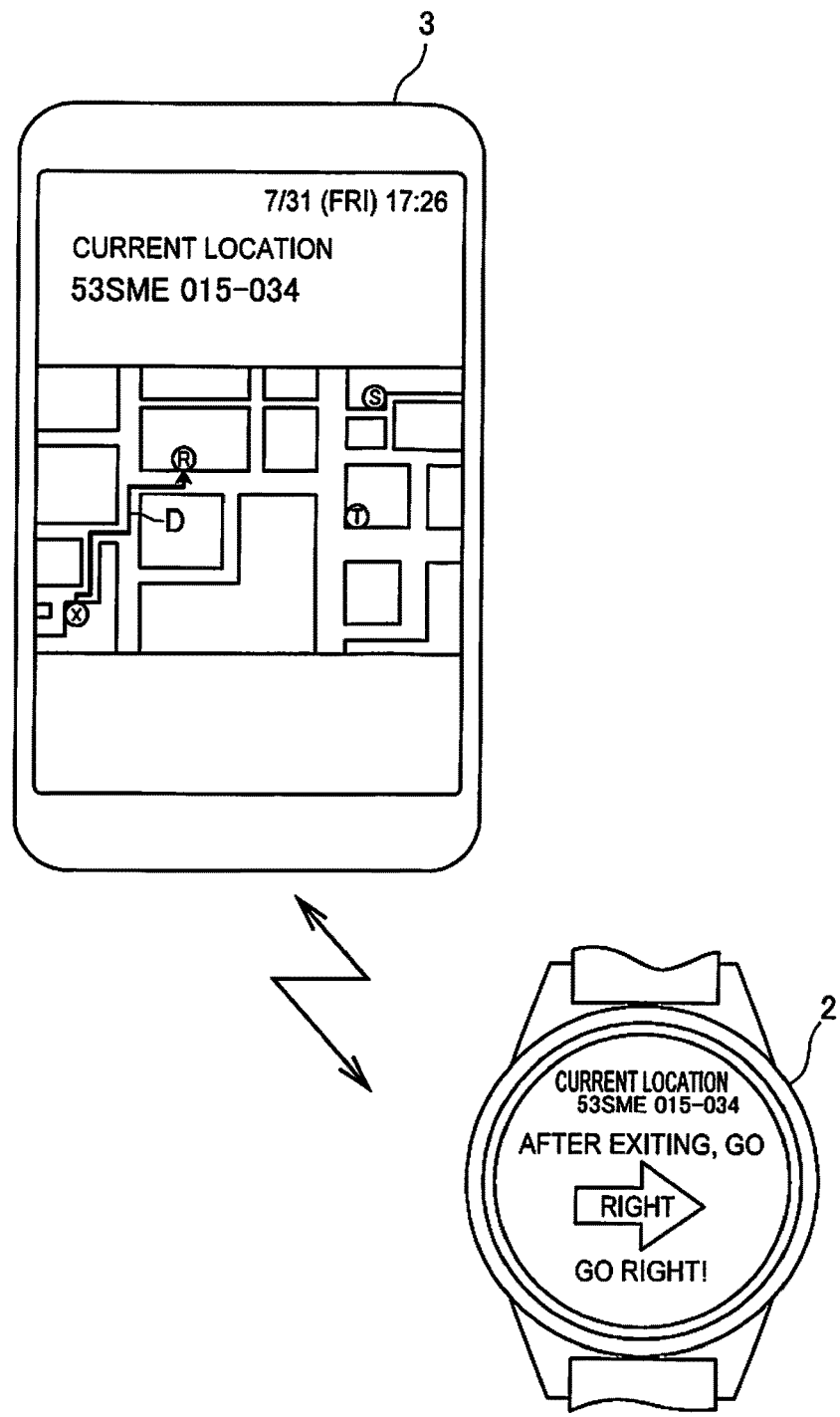
FIG. 6 shows an example of an evacuation route display.

FIG. 6 shows examples of evacuation route displays. In FIG. 6, the display content of the gateway device 3 and the wearable device 2 differ. More specifically, because it has a larger display area than the wearable device 2, the gateway device 3 displays the evacuation route D to the evacuation site R that is the closest of the three nearby evacuation sites R, S, T to the current user location X. The gateway device 3 also displays the UTM grid coordinates of the current location X, and the current date and time.

Because its display area is relatively small, the wearable device 2 displays only the UTM grid coordinates and the direction in which to proceed to the closest evacuation site R. By displaying the direction to proceed, the user 7 can be easily guided along the evacuation route even if the display screen is small, and the UTM grid coordinates of the current location X can be simultaneously displayed using unused display space.

In the reporting process, the controller 11, 21 may control the audio output unit 17, 27 to provide spoken guidance by, for example, speaking the UTM grid coordinates or the evacuation route. Furthermore, if a print command is received from the user 7, the controller 11, 21 may wirelessly transmit print data for printing the display image to a printer 9 (see FIG. 2) within communication range for printing out on a print medium.

Different display content is presented by the gateway device 3 and wearable device 2 in the examples in FIG. 6, but the same images may be displayed. In this case, if the user 7 can enlarge, move, and reduce the displayed images by touch operation of the gateway device 3 and wearable device 2, the evacuation route can be easily known independently of the size of the display screen.

As described above, the guidance system 1 according to this embodiment includes a wearable device 2 that is worn by the user 7 and can acquire the current location, and a gateway device 3 that communicates by near-field communication with the wearable device 2, and can acquire or store current location information. Working together, the wearable device 2 and gateway device 3 can determine whether the first positioning information P1 indicating the current location of the wearable device 2, or second positioning information P2 indicating the current location of the gateway device 3, more accurately identifies the location of the user 7 wearing the wearable device 2. As a result, the wearable device 2 and gateway device 3 can use the positioning information determined to be more accurate as the location of the user 7. The location of the user 7 can therefore be determined with great accuracy.

Because both the wearable device 2 and gateway device 3, using positioning information determined with high accuracy, can execute a process of reporting the positioning information determined to be most accurate to the user 7, the location can be accurately reported to the user 7, and the user 7 can easily and accurately communicate the user's location to the another party.

Moreover, positioning information determined to be highly accurate is converted to the grid coordinate system (UTM grid coordinates, which are grid map coordinates defined by an international standard) of maps used by emergency responders that are candidates for reporting the positioning information, and reported to the user 7. As a result, the location can be communicated accurately to the user 7 in a format appropriate for informing emergency responders, and the user can easily accurately communicate the user's location to emergency responders.

If the accuracy of the first positioning information P1 and second positioning information P2 are determined to be the same, the first positioning information P1 is used as the position of the user 7. Because the gateway device 3 is more likely to be at a location separated from the user 7 than the wearable device 2, this enables the user 7 to more easily acquire his position.

Because the wearable device 2 and gateway device 3 can also acquire and inform the user 7 of an evacuation route describing the route the user 7 should travel based on positioning information determined with high accuracy, the user 7 can be easily informed of the route to take.

To acquire this evacuation route, a evacuation guidance server 5 that provides evacuation routes based on positioning information is queried through the wearable device 2 for an evacuation route based on positioning information determined with high accuracy, and an evacuation route is acquired. Therefore, an appropriate evacuation route using information known on the evacuation guidance server 5 side is easier to acquire. The evacuation guidance server 5 can also acquire the location of the user 7, which can be useful in later rescue efforts.

In this embodiment of the invention, the gateway device 3 has a function for receiving disaster emergency reports D1. When a report D1 is received, a process of determining whether the first positioning information P1 or second positioning information P2 more accurately represents the location of the user 7, and processes using this positioning information are executed (positioning information reporting process, evacuation route reporting process). As a result, triggered by the disaster emergency report D1, the location of the user 7 can be quickly and accurately determined, and an appropriate response can be quickly devised based on this location.

The foregoing examples describe preferable embodiments of the invention, but do not limit the scope of the invention, and can be varied in many ways without departing from the scope of the accompanying claims. For example, the processes executed by the gateway device 3 and wearable device 2 in the foregoing embodiment may be switched between the gateway device 3 and wearable device 2. For example, the process of evaluating the accuracy of the first positioning information P1 and second positioning information P2 is executed primarily by the controller 21 of the gateway device 3 in the foregoing embodiment, but may be executed primarily by the controller 11 of the wearable device 2.

The wearable device 2 may also have the ability to receive disaster emergency reports D1. In this case, when a report D1 is received, the gateway device 3 and wearable device 2 may be configured to work together to start the process of evaluating the accuracy of the first positioning information P1 and second positioning information P2, and execute a process (positioning information reporting process, evacuation route reporting process) using the positioning information determined to be highly accurate. More specifically, if the gateway device 3 is a base station not carried by the user 7, the wearable device 2 may preferentially execute processes (receiving disaster emergency reports D1, determining the accuracy of the positioning information, asking for an evacuation route, reporting to the user 7).

This embodiment of the invention uses the GPS system to acquire the current location. Then, based on positioning accuracy information DP1, DP2 (information related to GPS positioning accuracy (DOP value, signal reception strength) and time-of-acquisition information). This enables accurately determining which positioning information is more accurate.

Note that this determination may be based on at least one of the DOP value, signal strength, and time-of-acquisition information insofar as which of the first positioning information P1 and second positioning information P2 is more accurate can be determined, or the decision may be based on other information.

The foregoing embodiment describes a configuration having an evacuation guidance server 5, but the evacuation guidance server 5 may be omitted if the gateway device 3 or wearable device 2 has the ability to determine an evacuation route. The foregoing embodiment also describes reporting positioning information and reporting an evacuation route as uses of positioning information, but the invention is not so limited. The foregoing embodiment also describes applying the invention to a guidance system 1 related to emergency response applications, but may be applied to guidance systems for non-emergency applications. More specifically, the invention can be broadly applied to positioning information application systems that use positioning information.

Because the wearable device 2 has a power generator 19 for generating operating power, the wearable device 2 can continue to be used even in disasters and other events when there is no power supply. As described above, the wearable device 2 is not limited to wristwatch-type configurations that are worn on the wrist of the user 7, and may be configured in any way enabling communication with the gateway device 3, displaying images, or making images visible to the user. More specifically, the wearable device 2 may be configured as eyeglasses, rings, or clothing, for example.

The function blocks of devices including the wearable device 2 and gateway device 3 shown in FIG. 2 represent functional configurations embodied by the cooperation of hardware and software, and the specific configuration of devices in the guidance system 1 is not limited to the foregoing block diagrams. Therefore, hardware corresponding individually to the function blocks shown in the function block diagrams is not required, and can obviously configured by a single processor embodying the functions of multiple function units by executing a program. Furthermore, some functions embodied by software in the foregoing embodiments may be embodied by hardware, and some functions embodied by hardware in the foregoing embodiments may be embodied by software. The specific detailed configuration of other parts of the guidance system 1 can also be modified as desired without departing from the scope of the accompanying claims.

REFERENCE SIGNS LIST

1 guidance system (positioning information application system)
2 wearable device
3 gateway device
4 communication network
5 evacuation guidance server (service-providing server)
6 disaster reporting server
7 user
9 printer
11, 21 controller (decision unit, positioning information application unit)
12, 22 sensor unit
13, 23 input unit
14, 24 storage
15, 25, 31 near-field communication unit
16, 26 display
17, 27 audio output unit
18, 28 position acquisition unit
22 communicator
32 print unit

The invention claimed is:

1. A positioning information application system comprising:
   a wearable device that is worn by a user and configured to acquire a current position of the wearable device; and
   a gateway device that is a device capable of near-field communication with the wearable device and is a mobile gateway device that is configured to acquire or store a current position of the gateway device,
   the gateway device having a decision processor that determines whether first positioning information indicating the current position of the wearable device, or second positioning information indicating the current position of the gateway device, is more accurate as a position of the user.

2. The positioning information application system described in claim 1, further comprising: a positioning information application processor that uses as the position of the user whichever of the first positioning information and the second positioning information was determined to be more accurate, the positioning information application processor executing a process of reporting the positioning information to the user.

3. The positioning information application system described in claim 2, wherein: the positioning information application processor converts the positioning information to a grid coordinate system of a map used by organizations that may be candidates to be informed of the positioning information, and reports to the user.

4. The positioning information application system described in claim 2, wherein: the positioning information application processor, when the decision processor determines the accuracy of the first positioning information and the second positioning information is the same, uses the first positioning information for the position of the user.

5. The positioning information application system described in claim 2, wherein: the positioning information application processor acquires based on the positioning information, and reports to the user, a route to be traveled by the user.

6. The positioning information application system described in claim 5, wherein: the positioning information application processor queries, through the gateway device, a service-providing server, which provides a route to be traveled based on positioning information, for a route based on the positioning information, and acquires the route.

7. The positioning information application system described in claim 2, wherein: at least one of the wearable device and the gateway device is configured to receive emergency reports, and when a report is received, the decision processor starts the decision process, and the positioning information application processor executes the application process.

8. The positioning information application system described in claim 1, wherein: acquisition of the current position is done using GPS: and the decision processor, based on at least information related to GPS positioning accuracy, determines whether the first positioning information or the second positioning information is more accurate.

9. The positioning information application system described in claim 1, wherein:
   the gateway device is a smartphone carried by the user, a mobile terminal that is other than a smartphone and is carried by the user, a drone that moves in conjunction with movement of the user, or a mobile terminal that is other than a drone and moves in conjunction with movement of the user.

10. The positioning information application system described in claim 1, wherein: at least one of the wearable device and gateway device is capable of receiving a report from an external server; the gateway device sends whichever of the first positioning information and second positioning information was determined to be the more accurate high precision positioning data as the position of the user to the external server, and has a positioning information application processor that receives position application information based on the high precision positioning data from the external server; and at least one of the wearable device and gateway device reports the position application information to the user.

11. The positioning information application system described in claim 10, wherein:
   the report is a disaster report of a disaster that occurred, and the position application information is route information for a route the user should travel.

* * * * *